Patented Nov. 1, 1927.

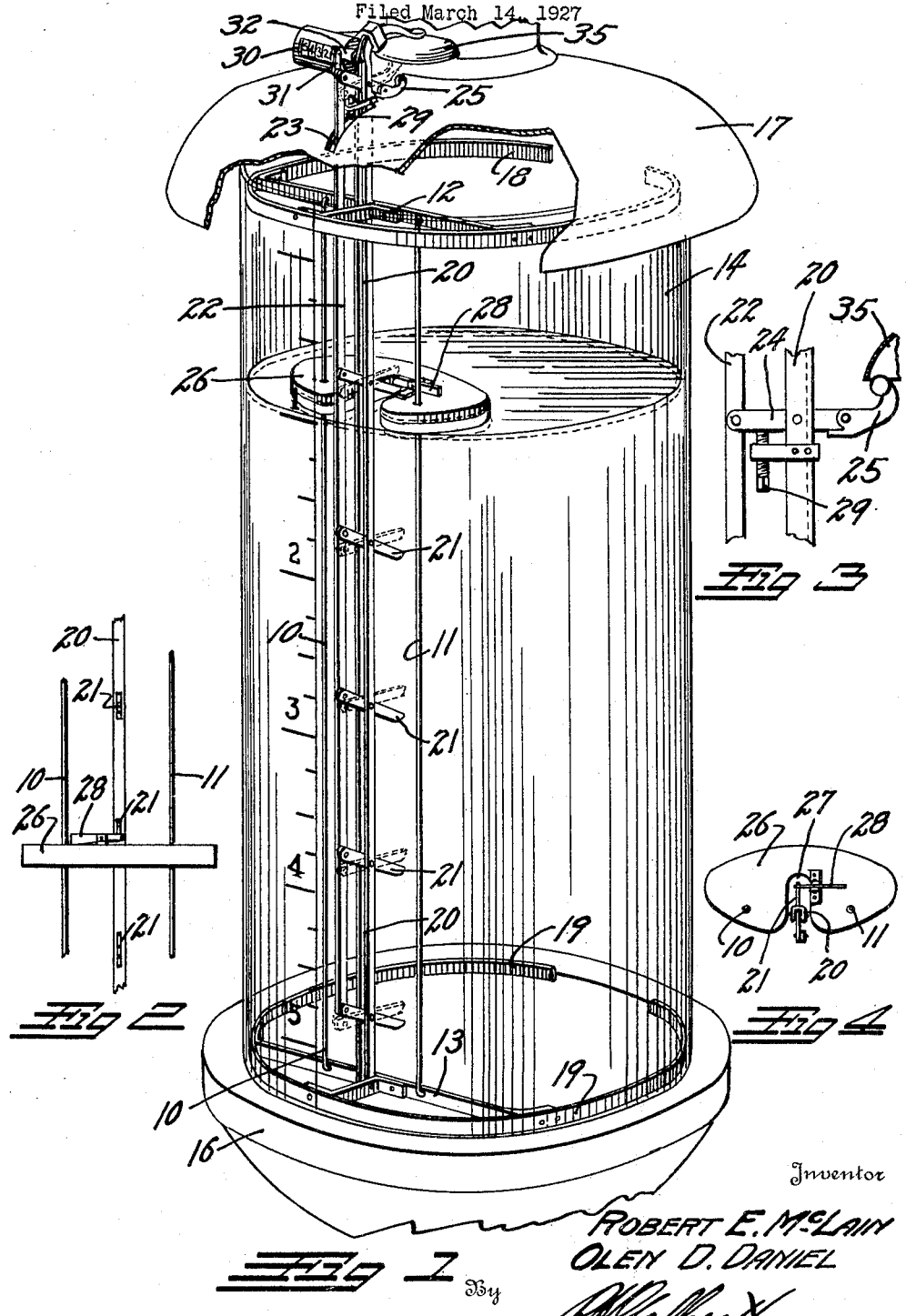

1,647,806

UNITED STATES PATENT OFFICE.

ROBERT E. McLAIN AND OLEN D. DANIEL, OF DENVER, COLORADO.

AUDIBLE INDICATOR AND METER FOR GASOLINE PUMPS.

Application filed March 14, 1927. Serial No. 175,329.

This invention relates to a device for giving an audible indication of the amount of liquid being drawn from a container. It is more particularly applicable to gasoline gravity systems in which the gasoline flows by gravity from an elevated, transparent container to an automobile tank. It is often impossible for the automobile driver to see the visible indications without getting out of the car. With this invention, however, attention to the visible indications is not necessary for an audible indication will be given as each gallon is drawn.

The principal object of this invention is to provide an efficient mechanism which may be applied to the present gasoline gravity tanks and which will give an audible signal as predetermined amounts are drawn from the tank.

Another object of the invention is to combine a meter with the indicator which will indicate the total number of predetermined amounts, usually gallons, which have been drawn from the container.

Other objects and advantages reside in the detail construction of the invention, which is designed for economy, simplicity and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of our invention in place within the transparent glass gravity tank of a gasoline pump.

Fig. 2 is a detail front view of the tank float with its accompanying guides.

Fig. 3 is an enlarged detail view of the bell ringing mechanism employed in the device.

Fig. 4 is a plan view of the float.

In the drawing, a glass gravity tank, such as usually employed on gasoline pumps, is indicated at 14 with its usual gallon indications at 15. The tank is carried on the top of a pump 16 and closed by means of an ornamental cap 17.

The invention employs vertical guides 10 and 11 which extend between frames 12 and 13 adapted to be placed at the top and bottom of the tank 14. The frames 12 and 13 are carried by rings 18 and 19, respectively, formed of spring steel or similar material. These rings are open at one side and are slightly compressed when being placed in the tank so as to engage the inner surface of the tank by their inherent elasticity.

A stationary trip supporting bar 20 extends vertically between the frames 12 and 13 and through a slot 23 in the cap 17 to support a bell 35. This bar is preferably U-shaped in cross section as shown, and contains a series of pivoted trips 21, spaced to correspond with the gallon indications 15. The rearward extremities of the trips 21 are pivotally connected to a common vertical operating bar 22 which also extends through the cap 17 and terminates in a bell ringing lever 24 which is pivoted on the trip supporting bar 20. On the free extremity of the bell ringing lever 24 a bell clapper 25 is pivoted.

The vertical guides 10 and 11 pass through openings in a float 26. A depression 27 in the float 26 surrounds the trip supporting bar 20 and the free extremities of the trips 21. Extending across this depression is a pivoted pawl 28 arranged to engage and operate the trips as the float moves downwardly and to pass over the trips as the float moves upwardly.

In the drawing, the device is illustrated in solid line at the point immediately preceding the complete discharge of the first gallon. The pawl 28 has engaged the topmost trip 21 and the weight of the float 26 has caused this trip to raise the operating bar 22 and move the clapper 25 away from the bell. When the gallon position has been reached, the pawl will pass over the end of the trip allowing the operating bar 22 to fall until the bell lever 24 strikes an adjustable stop 29. This will act to throw the clapper 25 against the bell giving an audible indication that a gallon of gasoline has left the tank. This operation will be repeated for each gallon as the surface of the fluid descends in the tank.

When the tank is being filled and the surface is rising the float will rise therewith and the pawl 28 will strike each of the trips but since it is free to tilt downwardly at its inner end will pass the trips with a ratchet-like action and not operate the mechanism. On the downward passage the rearward end of the pawl engages the float so that it cannot tilt.

In order to keep a record of the total number of gallons drawn from the tank, a recording meter 30 having an operating lever 32 is secured to the trip supporting bar 20 adjacent its upper extremity. This meter is operated by means of a connecting link 31 which connects the meter operating lever 32 to the operating bar 22.

As illustrated the bell and meter are placed above the cap of the tank, if desired, these may be placed within the tank itself.

The depression 27 passes sufficiently far within the float to place the pawl 28 at substantially the center of gravity of the float so that the float will not tilt when the pawl engages a trip.

While a specific form of the invention has been described and illustrated herein, it is desired to be understood that the same may be varied, within the scope of the appended claims without departing from the spirit of the invention.

Having thus described the invention, what we claim and desire to secure by Letters Patent is:—

1. Apparatus for indicating the withdrawal of predetermined amounts from a tank comprising, a vertical series of pivoted trips; an operating bar pivotally connected to each of said trips; indicating means operatively connected to said operating bar; contact means arranged to successively engage the trips in said series so as to impart intermittent motion to said operating bar and a float within said tank operatively connected to said contact means.

2. Apparatus for indicating the withdrawal of predetermined amounts from a tank comprising, a vertical series of pivoted trips; an operating bar pivotally connected to each of said trips; indicating means operatively connected to said operating bar; a float arranged within said tank; and a ratchet mechanism operated by said float and arranged to allow said float to move upwardly without operating said trips and to cause said float to operate said trips as it moves downwardly.

3. Apparatus for indicating the withdrawal of predetermined amounts from a tank comprising, a vertical series of pivoted trips; an operating bar pivotally connected to each of said trips and operated thereby; indicating means operatively connected to said operating bar; a float arranged within said tank; a ratchet mechanism operated by said float and arranged to allow said float to move upwardly without operating said trips and to cause said float to operate said trips as it moves downwardly, said ratchet mechanism comprising a pivoted pawl carried by said float; and means for limiting the movement of said pawl in one direction.

4. Apparatus for indicating the withdrawal of predetermined amounts from a tank comprising a vertical supporting bar adapted to be placed within said tank; a series of trips pivoted to and projecting from said supporting bar; an operating bar adjacent said supporting bar, said operating bar being pivoted to each of said trips; indicating mechanism arranged to be actuated by said operating bar; and a float adapted to tilt said trips as it moves downwardly in said tank.

5. Apparatus for indicating the withdrawal of predetermined amounts from a tank comprising a vertical supporting bar adapted to be placed within said tank; a series of trips pivoted to and projecting from said supporting bar; an operating bar adjacent said supporting bar, said operating bar being pivoted to each of said trips; indicating mechanism arranged to be actuated by said operating bar; a float adapted to tilt said trips as it moves downwardly in said tank; and guides arranged to maintain said float in operative position relative to said trips.

6. Apparatus for indicating the withdrawal of predetermined amounts from a tank comprising a vertical supporting bar adapted to be placed within said tank; a series of trips pivoted to and projecting from said supporting bar; an operating bar adjacent said supporting bar, said operating bar being pivoted to each of said trips; indicating mechanism arranged to be actuated by said operating bar; a float; and a pawl carried by said float and adapted to operate said trips as said float moves downwardly and pass said trips as said float moves upwardly.

7. Apparatus for indicating the withdrawal of predetermined amounts from a tank comprising a vertical supporting bar adapted to be placed within said tank; a series of trips pivoted to and projecting from said supporting bar; an operating bar adjacent said supporting bar, said operating bar being pivoted to each of said trips; indicating mechanism arranged to be actuated by said operating bar; a float adapted to tilt said trips as it moves downwardly in said tank, said indicating mechanism comprising a bell; and a clapper adapted to engage said bell at each downward movement of said operating bar.

8. Apparatus for indicating the withdrawal of predetermined amounts from a tank comprising a vertical supporting bar adapted to be placed within said tank; a series of trips pivoted to and projecting from said supporting bar; an operating bar adjacent said supporting bar, said operating bar being pivoted to each of said trips; indicating mechanism arranged to be actuated by said operating bar; a float adapted to tilt said trips as it moves downwardly in said tank, said indicating mechanism comprising a bell; a clapper adapted to engage said bell at each downward movement of said operating bar; and means for limiting the downward movement of said operating bar.

9. Apparatus for indicating the withdrawal of predetermined amounts from a tank comprising frames arranged to be placed above each other in engagement with said tank; a supporting bar extending vertically between said frames; trips pivoted to and extending outward from said supporting bar; an operating bar pivoted to one extremity of each of said trips; indicating means arranged to be operated by the movement of said operating bar; and a float arranged to impart movement to said operating bar through the medium of said trips.

10. Apparatus for indicating the withdrawal of predetermined amounts from a tank comprising frames adapted to be placed above each other within said tank; a supporting bar extending vertically between said frames; trips pivoted to and extending outward from said supporting bar; an operating bar pivoted to one extremity of each of said trips; indicating means arranged to be operated by the movement of said operating bar; a float arranged to impart movement to said operating bar through the medium of said trips; and guides extending between said frames and arranged to guide the vertical movement of said float.

11. Means for securing an indicating mechanism within a cylindrical tank, comprising frames arranged to be placed adjacent each extremity of said tank and open bands of spring material secured to said frames and arranged to expand against the inner surface of said tank.

In testimony whereof we affix our signatures.

ROBERT E. McLAIN.
OLEN D. DANIEL.